US011346449B2

(12) United States Patent
Baheti

(10) Patent No.: US 11,346,449 B2
(45) Date of Patent: May 31, 2022

(54) SELF-CENTERING SEAL COMPONENT FOR HIGH SPEED SHAFT ASSEMBLIES

(71) Applicant: KAYDON RING & SEAL, INC.

(72) Inventor: Sanjay Baheti, Brookeville, MD (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 196 days.

(21) Appl. No.: 16/750,504

(22) Filed: Jan. 23, 2020

(65) Prior Publication Data

US 2021/0231216 A1    Jul. 29, 2021

(51) Int. Cl.
*F16J 15/44* (2006.01)
*F16J 15/32* (2016.01)
*F16J 15/447* (2006.01)

(52) U.S. Cl.
CPC ............. *F16J 15/32* (2013.01); *F16J 15/447* (2013.01); *F16J 15/4472* (2013.01); *F16J 15/4476* (2013.01)

(58) Field of Classification Search
CPC ..... F16J 15/447; F16J 15/4472; F16J 15/4476
See application file for complete search history.

(56) References Cited

U.S. PATENT DOCUMENTS

| 3,285,614 | A | * | 11/1966 | McClenathan | ...... | F16J 15/3484 |
| | | | | | | 277/368 |
| 4,416,458 | A | * | 11/1983 | Takenaka | ............. | F16J 15/3412 |
| | | | | | | 277/399 |
| 5,388,843 | A | * | 2/1995 | Sedy | .................... | F16J 15/3412 |
| | | | | | | 277/397 |
| 5,722,665 | A | * | 3/1998 | Sedy | .................... | F16J 15/3412 |
| | | | | | | 277/400 |
| 6,428,012 | B1 | * | 8/2002 | Amaral | ............... | F16J 15/3472 |
| | | | | | | 277/372 |

(Continued)

FOREIGN PATENT DOCUMENTS

| EP | 3453928 A1 | 3/2019 | |
| WO | WO-2016088659 A1 * | 6/2016 | ............. F16J 15/348 |

OTHER PUBLICATIONS

Search report from the British patent officer in related application No. GB2017317.5 dated Mar. 22, 2021.

*Primary Examiner* — Christine M Mills
*Assistant Examiner* — L. Susmitha Koneru
(74) *Attorney, Agent, or Firm* — J-Tek Law PLLC; Scott T. Wakeman; Mark A. Ussai

(57) ABSTRACT

A seal assembly component includes an annular body having a centerline, first and second axial ends spaced along the centerline, an inner circumferential surface, and an opposing outer circumferential surface. The inner surface defines a bore for receiving a shaft and is sized such that the body inner surface frictionally engages the shaft outer surface to couple the component with the shaft. At least three cavities extend axially from the body first axial end and are spaced circumferentially about the centerline. Each cavity is located adjacent to the bore so as to define a separate centering body portion between a radially innermost surface section of the cavity and an axially-extending centering surface section of the body inner circumferential surface located inwardly of the cavity. Any radial growth of each centering body portion is lesser than concurrent radial growth of remaining portions of the body during rotation of the shaft.

12 Claims, 6 Drawing Sheets

(56) References Cited

U.S. PATENT DOCUMENTS

| | | | |
|---|---|---|---|
| 7,051,694 B2* | 5/2006 | Warnecke | F02F 11/007 |
| | | | 123/195 C |
| 2010/0201074 A1* | 8/2010 | Haynes | F16J 15/441 |
| | | | 277/361 |
| 2013/0234399 A1 | 9/2013 | Justak | |
| 2018/0128366 A1* | 5/2018 | Weng | F16H 57/0456 |
| 2018/0258780 A1* | 9/2018 | Fan | F01D 11/001 |
| 2019/0113080 A1* | 4/2019 | Kamiya | F16C 33/805 |
| 2019/0376558 A1* | 12/2019 | Kimura | F16J 15/3412 |

\* cited by examiner

FIG. 1

SELF-CENTERING SEAL COMPONENT FOR HIGH SPEED SHAFT ASSEMBLIES

BACKGROUND OF THE INVENTION

The present invention relates to seals, and more particularly to seal components for high speed shaft assemblies.

Seal assemblies often include annular components mounted upon a rotatable shaft and providing one or more surfaces against which seal non-rotatable or fixed components or upon which are mounted one or more runners providing such seal engagement surfaces. Particularly with high speed applications, such as shaft rotational speeds over 10,000 rpm or even 21,000 rpm, such seal components experience substantial radial growth due to the high centrifugal forces generated within the component. If sufficiently great, the radial growth of such seal components may cause eccentric operation and excessive shaft vibration due to resulting imbalance.

SUMMARY OF THE INVENTION

In one aspect, the present invention is a component for a seal assembly for sealing about a shaft, the shaft being rotatable about a central axis and having an outer circumferential surface. The seal component comprises an annular body having a centerline, first and second axial ends spaced apart along the centerline, an inner circumferential surface, and an opposing outer circumferential surface. The inner circumferential surface defines a central bore for receiving the shaft and is sized such that the body inner surface is frictionally engageable with the shaft outer surface to couple the component with the shaft. Further, at least three cavities extend axially from the body first axial end, are spaced circumferentially about the centerline and are located adjacent to the bore.

In another aspect, the present invention is again a component for a seal assembly for sealing about a shaft, the shaft being rotatable about a central axis and having an outer circumferential surface. The seal component comprises an annular body having a centerline, first and second axial ends spaced apart along the centerline, an inner circumferential surface, and an opposing outer circumferential surface. The inner circumferential surface defines a central bore for receiving the shaft and is sized such that the body inner surface is frictionally engageable with the shaft outer surface to couple the component with the shaft. At least three cavities extend axially from the first axial end and are spaced circumferentially about the centerline. Each cavity is located adjacent to the bore so as to define a separate centering body portion between a radially innermost surface section of the cavity and an axially-extending centering surface section of the body inner circumferential surface located radially inwardly of the cavity. As such, any radial growth of each one of the centering body portions is lesser than concurrent radial growth of remaining portions of the body during rotation of the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1 is an axial cross-sectional view of a seal assembly including a seal component in accordance with the present invention;

DETAILED DESCRIPTION OF THE INVENTION

Figure 2:
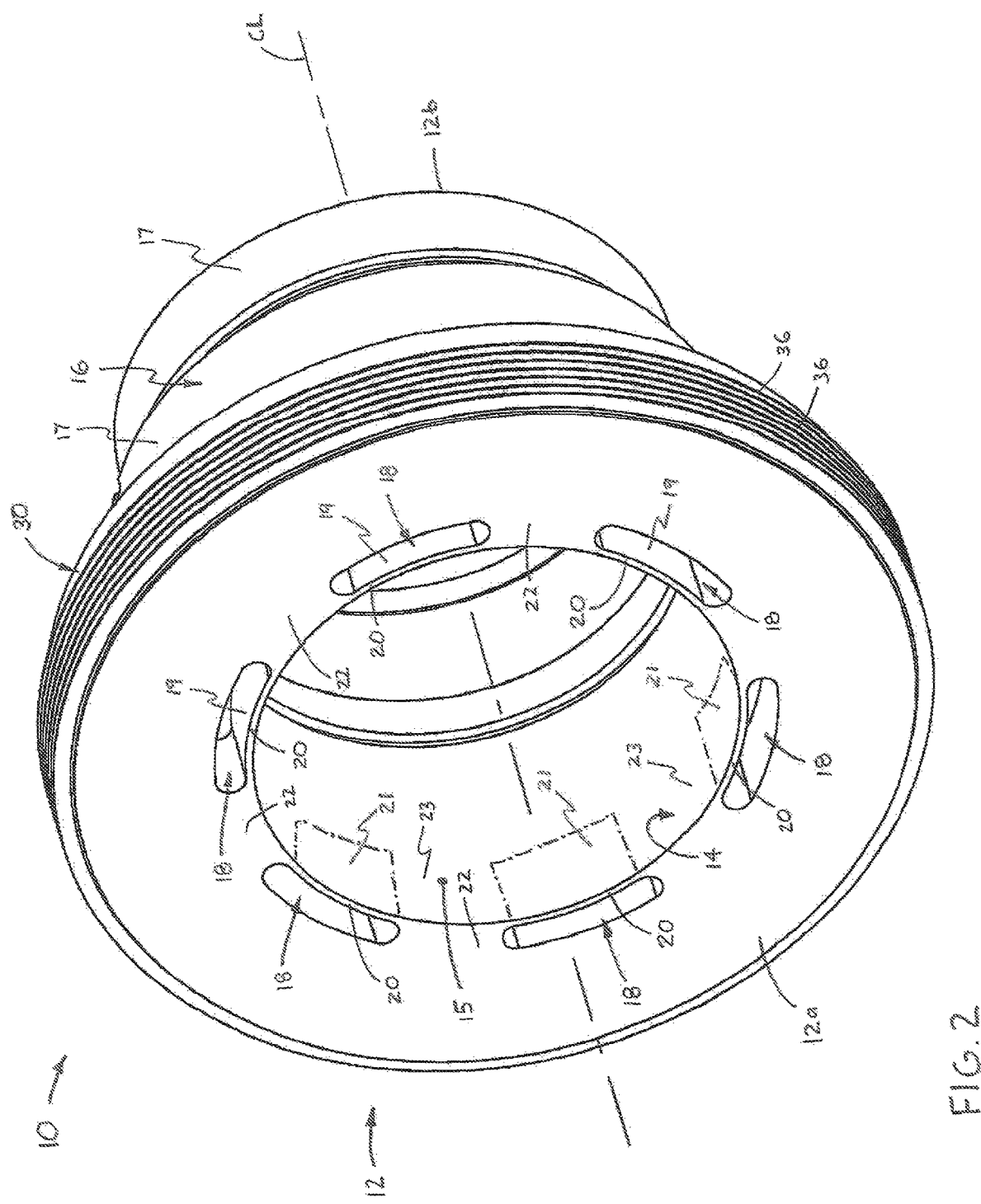
FIG. 2 is a front perspective view of the seal component.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
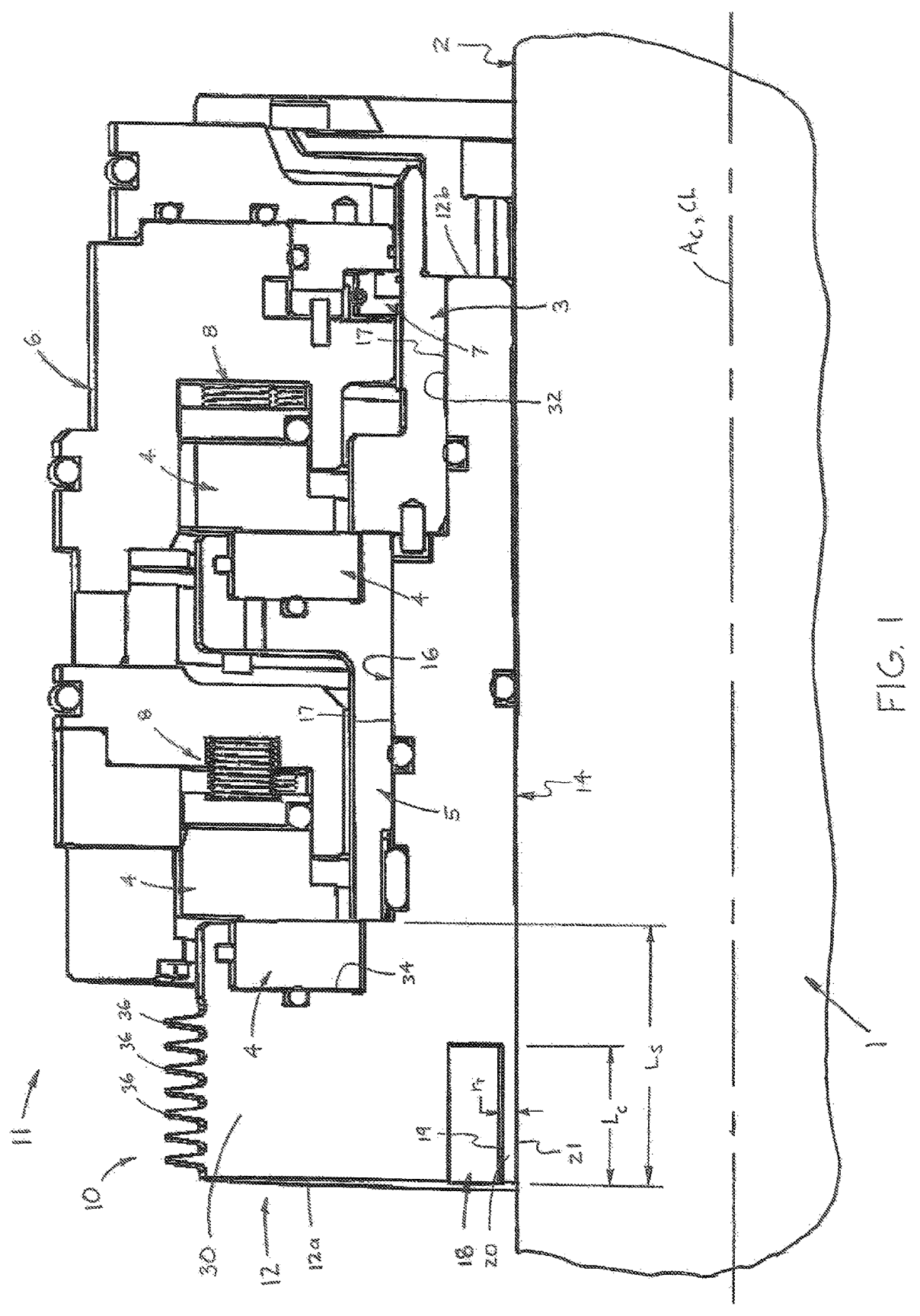

Referring now to the drawings in detail, wherein like numbers are used to indicate like elements throughout, there is shown in FIGS. 1-6 a component 10 for a seal assembly 11 for sealing about a shaft 1, preferably a dry gas seal assembly as described in further detail below. The shaft 1 is rotatable about a central axis $A_C$ and has an outer circumferential surface 2, and is preferably used in a relatively high speed application, such as for example, an engine turbine, a compressor, etc. The shaft 1 is configured to rotate at relatively "high" rotational speeds of at least ten thousand rotations per minute (10,000 rpm) and preferably greater than twenty-one thousand rotations per minute (21,000 rpm). The seal component 10 basically comprises an annular body 12 having a centerline CL, first and second axial ends 12a, 12b spaced apart along the centerline CL, an inner circumferential surface 14 and an opposing outer circumferential surface 16. The inner circumferential surface 14 defines a central bore 15 for receiving the shaft 1 and is sized (i.e., diametrically) such that the body inner surface 14 is frictionally engageable with the shaft outer surface 2 to couple the component 10 with the shaft 1, preferably by means of a shrink fit. Further, at least three cavities 18 extend axially from the first axial end 12a, are spaced circumferentially about the body centerline CL and are each located adjacent to the bore 15.

Further, a separate centering body portion 20 is defined between each cavity 18, specifically a radially innermost surface section 19 of the cavity 18, and an axially-extending centering surface section 21 of the body inner circumferential surface 14 located radially inwardly of the particular cavity 18. Preferably, each one of the cavities 18 is formed as an arcuate slotted opening, such that each centering body portion 20 is formed as a relatively thin web of material. More specifically, a radial thickness $r_T$ (FIGS. 1 and 4) is defined between the radially innermost surface section 19 of each cavity 18 and the adjacent centering surface section 21 and each cavity 18 is located relative to the body bore 15 such the radial thickness $r_T$ has a value between about fifty thousandths of an inch (0.050″) and about three hundred thousandths of an inch (0.300″). Although preferably formed as an arcuate slotted opening, each cavity 18 may alternatively be formed as substantially circular openings or have any other appropriate shape. Furthermore, the annular body 12 preferably has six of the cavities 18, but may have any other appropriate number of cavities 18 as desired (e.g., four, five, seven, etc.).

Figure 6:
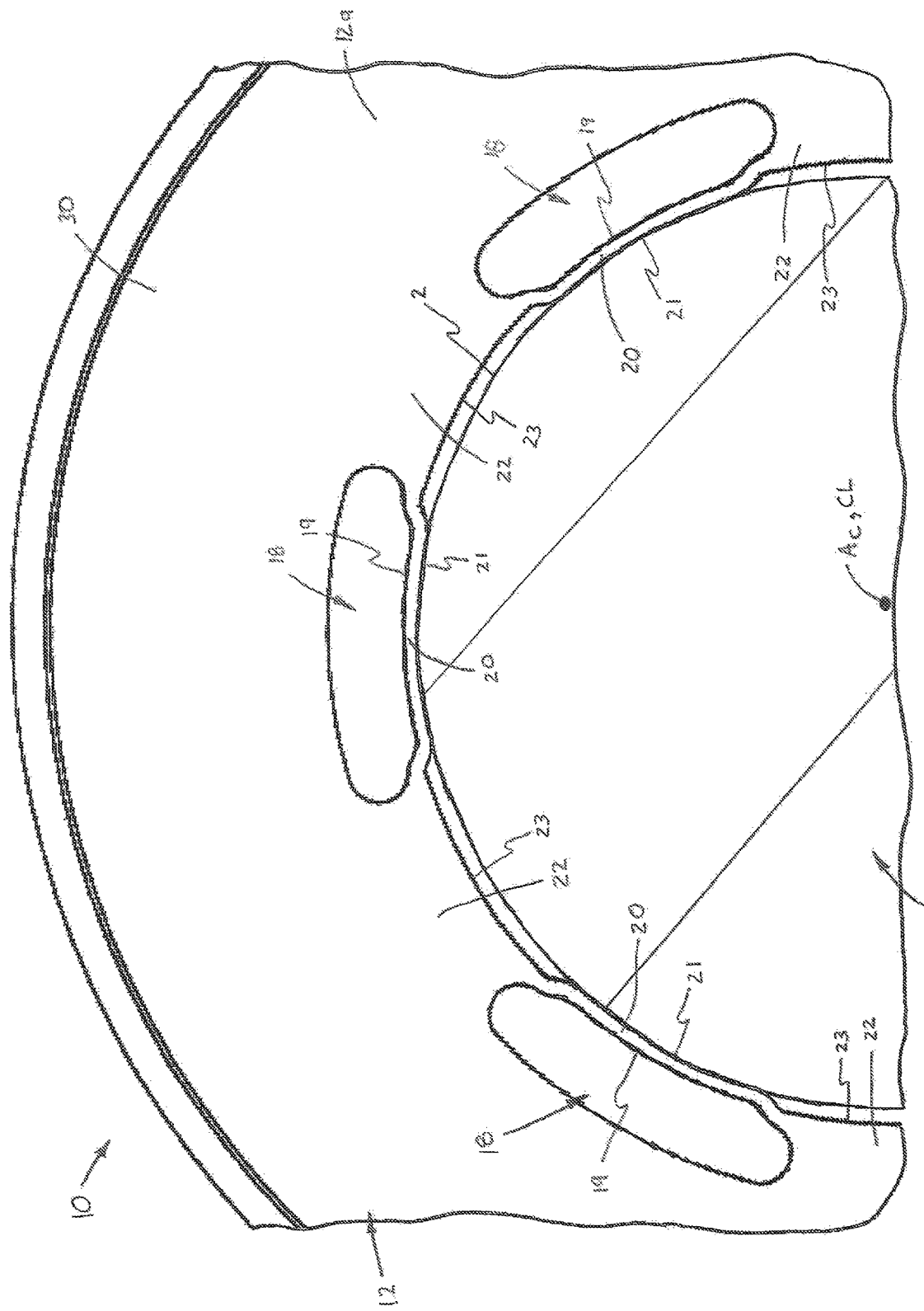
FIG. 6 is an enlarged, broken-away radial cross-sectional view of the seal assembly of FIG. 1, showing radial growth of the seal component during high speed rotation.

By providing the annular body 12 with the cavities 18, any radial growth of each one of the centering body portions 20 formed thereby is substantially lesser than concurrent radial growth of remaining portions 22 of the body 12 (i.e., portions without a cavity 18) during rotation of the shaft 1, as depicted in FIG. 6. That is, during high speed rotation of the shaft 1 over 10,000 rpm and particularly over 21,000 rpm, centrifugal forces generated within the component 10 cause substantial radial strain or growth within the remaining portions 22 of the annular body 12 due to the greater mass of these body portions 22. As a result, each one of the centering surface sections 21 remain in contact with (or at least close proximity to) the shaft outer surface 2 when remaining sections 23 of the body inner circumferential surface 14 are spaced radially outwardly from the shaft outer surface 2, particularly when the shaft 1 rotates at angular velocities/rotational speeds greater than ten thousand rotations per minute (10,000 rpm) and more significantly over 21,000 rpm. Further, each one of the centering surface sections 21 is located so as to center the annular body 12 about the shaft axis $A_C$. In other words, the at least three surface sections 21 (or six sections 21, etc.) are spaced at substantially equal angular intervals about the circumference of the shaft 1 such that contact between the surface sections 21 and the shaft outer surface 2 positions the centerline CL of the body 12 substantially coaxially with the shaft axis $A_C$.

By maintaining the seal component 10 centered about the axis $A_C$ during high speed rotation of the shaft 1, dynamic radial imbalance is minimized (or even eliminated) and eccentric operation is avoided, which substantially eliminates the primary source of vibration of the shaft 1. Having described the basic components and features above, these and other aspects of the present seal component 10 are described in further detail below.

Figure 3:
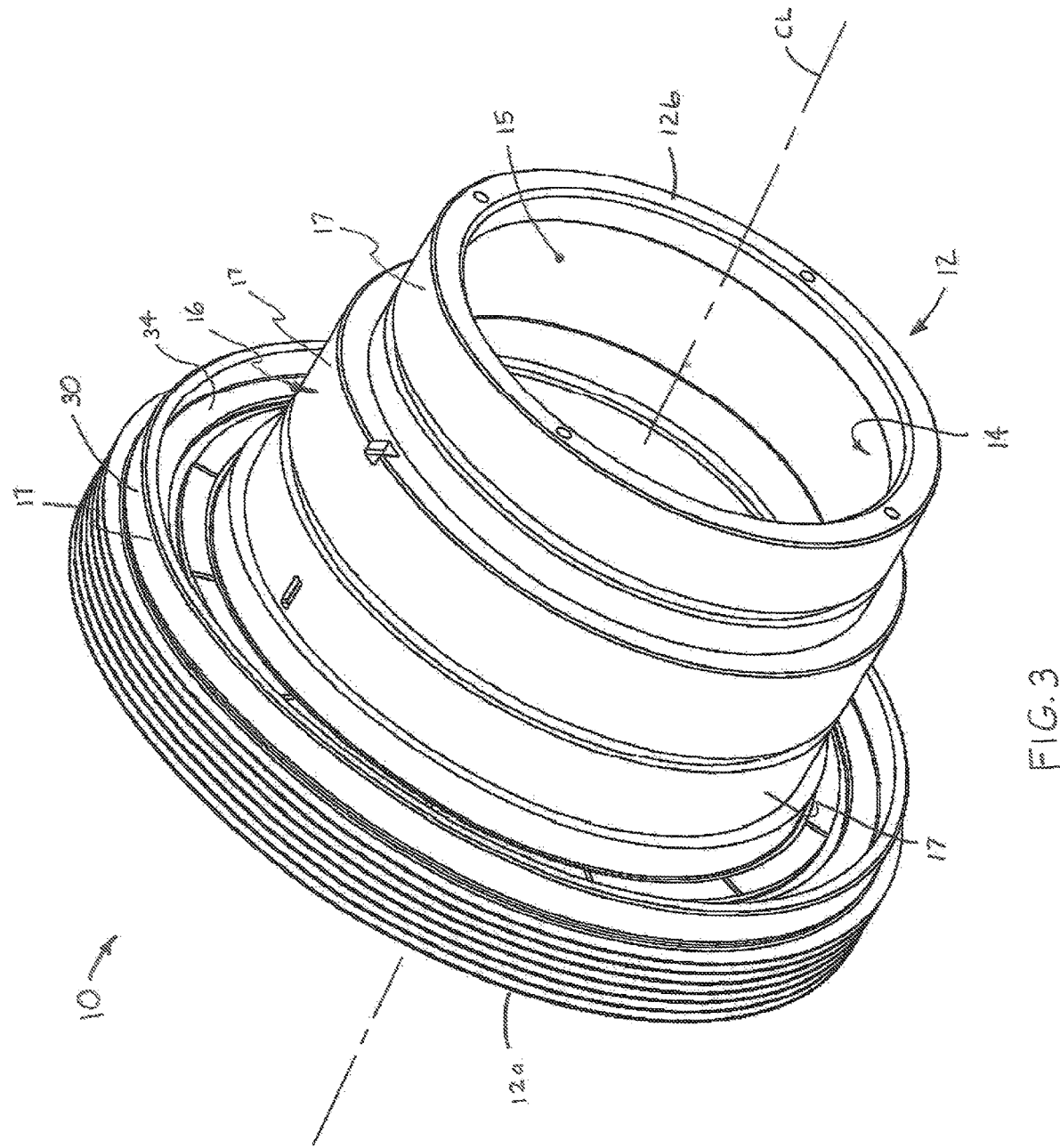
FIG. 3 is a rear perspective view of the seal component.
Figure 4:
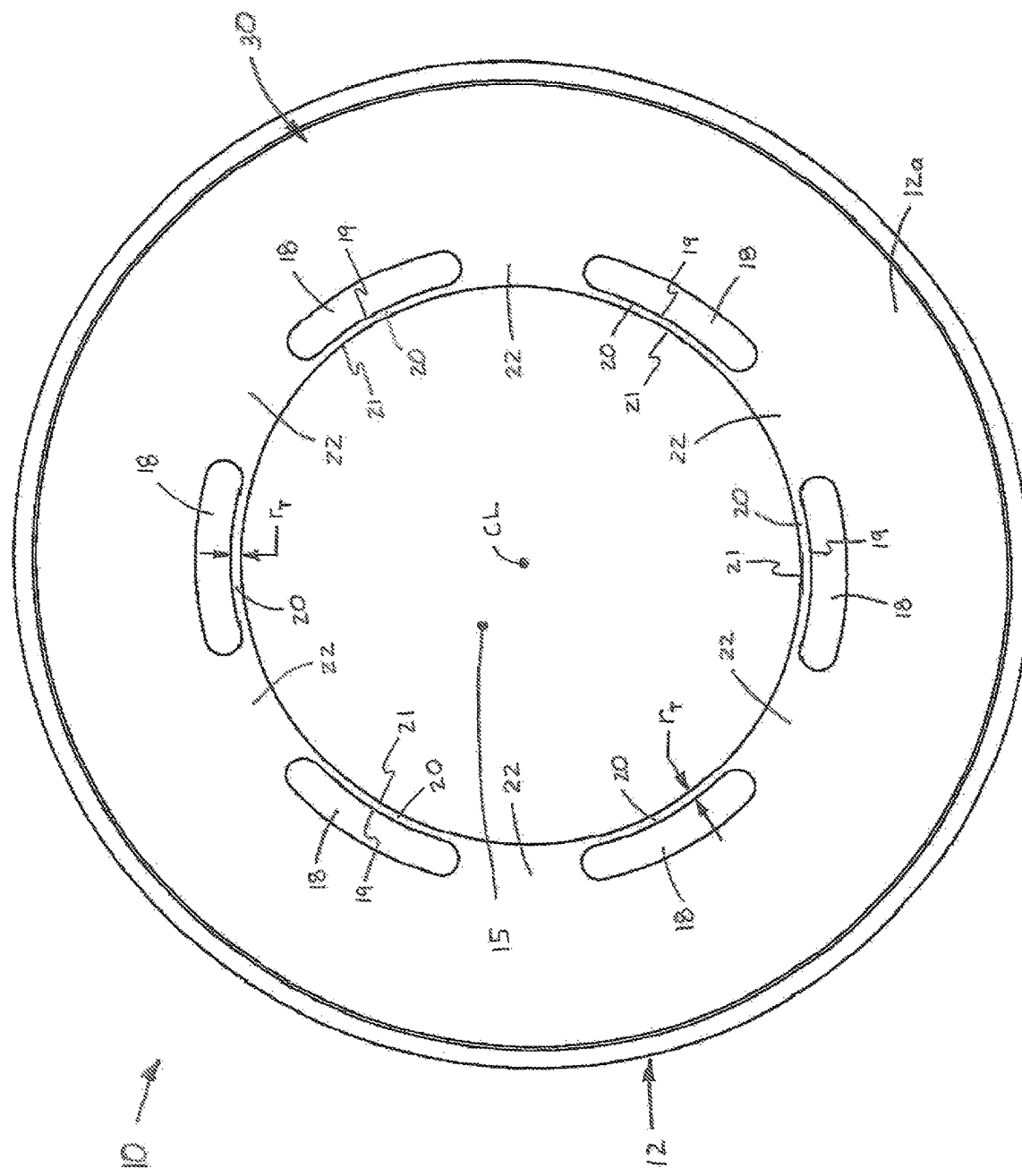
FIG. 4 is front end view of the seal component.
Figure 5:
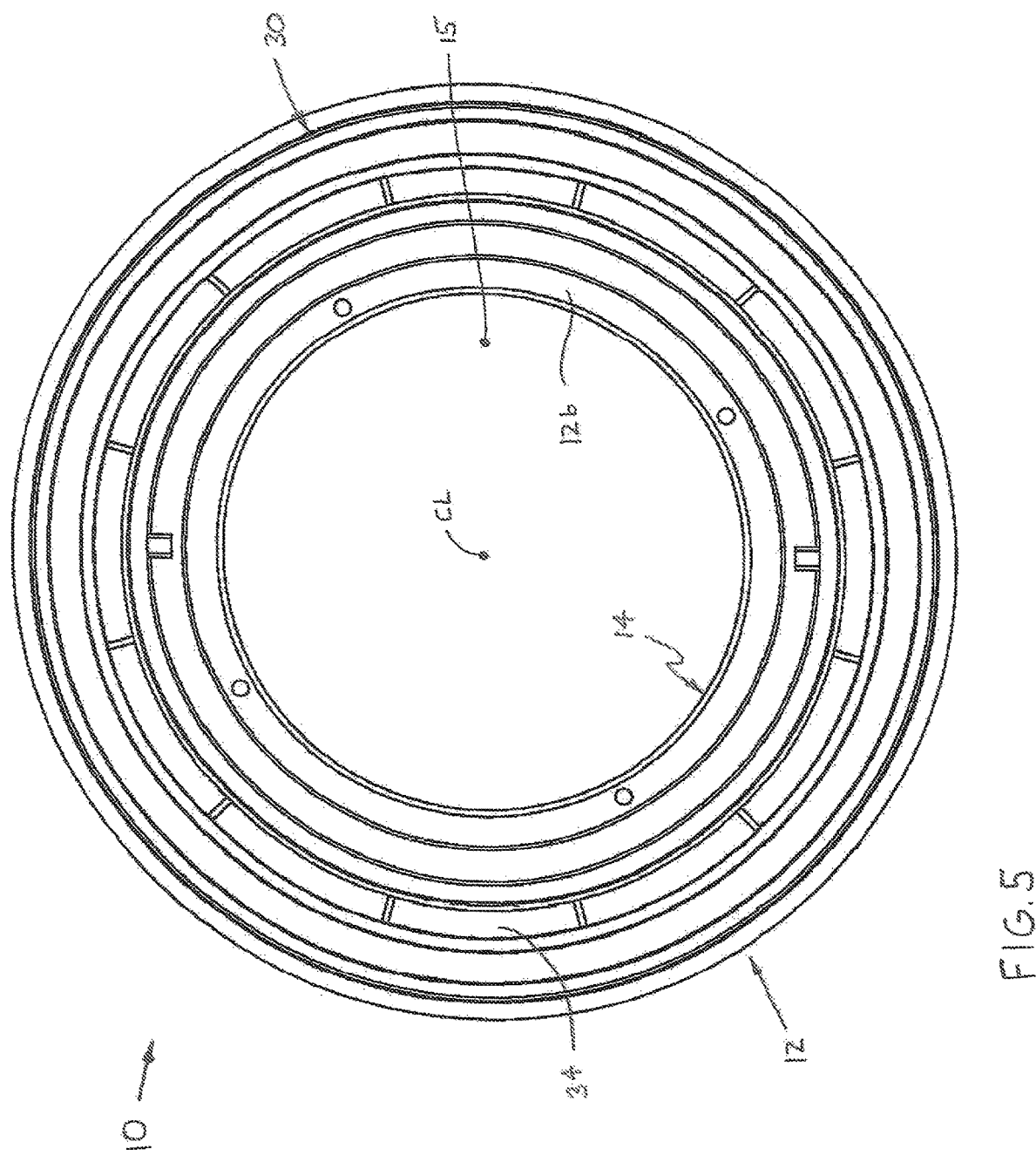
FIG. 5 is a rear end view of the seal component.

Referring to FIGS. 1-3, in one presently preferred application, the annular body 12 of the seal component 10 has a radially-outwardly extending shoulder 30 adjacent to the first axial end of the body 12a and having an axial length $L_S$ (FIG. 1). As such, the mass of the annular body 12 at the first axial end 12a is substantially greater than the mass of the annular body 12 at the second axial end 12b. Thus, centrifugal growth of the seal component 10 is greatest within the regions of the shoulder 30. Therefore, the cavities 18 are preferably located so as to extend axially inwardly from the body first end 12a so as to be disposed radially inwardly of the shoulder 30. Preferably, each one of the cavities 18 has an axial length $L_C$ of at least a quarter of the axial length $L_S$ of the shoulder 30, as indicated in FIG. 1. Most preferably, each cavity 18 has an axial length $L_C$ of at least two hundred fifty thousandths of an inch (0.250″), regardless of whether or not the body 12 has a shoulder 30.

Further, the outer circumferential surface 16 of the annular body 12 is preferably formed of a plurality of axially-spaced, adjacent surface sections 17 each having an outside diameter (not indicated) with a value greater or lesser than the value of the outside diameters of the other surface sections 17. Such varying outside diameters enable the installation or mounting of different seal elements or parts about the seal component 10. Preferably, the annular body 12 of the seal component 10 includes one or more of a seal runner surface (not shown), a mounting surface 32 for a seal runner 3, an axial-extending annular mounting groove 34 for an axial face seal member 4, and a plurality of radially-outwardly extending ridges 36 for providing a portion of a labyrinth seal. However, the seal component 10 may be formed without any of these features or with any other appropriate seal features or structures.

Referring particularly to FIG. 1, in one exemplary application, the seal component 10 is incorporated into a dry gas seal assembly 11 that includes a generally tubular seal runner 3 and a generally tubular face-seal retainer 5 disposed about separate sections 17 of the outer surface 16 and the axial face seal member 4 mounted in the annular groove 34. The seal assembly 11 further includes an outer case assembly 6 disposed about the seal component 10, three other axial face seal members 4 coupled with the case assembly 6 or with the face-seal retainer 5, which include both rotatable and fixed seal members 4, a circumferential seal member 7 disposed about the seal runner 3, and biasing assemblies 8 for biasing the face seal members 4. However, the seal component 10 may be used in any appropriate seal assembly, e.g., including one or more circumferential seals only, axial face seal(s) only, formed as an oil seal, etc. Further, the annular body 12 may have any other appropriate structure, such as for example, formed without a shoulder and having a substantially constant outer surface 16, having cavities 18 formed at both ends 12a, 12b of the body 12 or with cavities 18 extending inwardly only from the body second axial end 12b, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. An assembly comprising:
  a shaft rotatable about a central axis and having an outer circumferential surface; and
  a seal component including an annular body having a centerline, first and second axial ends spaced apart along the centerline, an inner circumferential surface, an opposing outer circumferential surface, the inner circumferential surface defining a central bore receiving the shaft and being sized such that the entire body inner surface is frictionally engaged with the shaft outer surface to couple the component with the shaft, and at least three cavities extending axially from the first axial end and spaced circumferentially about the centerline, each cavity being located adjacent to the bore so as to define a separate centering body portion between a radially innermost surface section of the cavity and an axially-extending centering surface section of the body inner circumferential surface located radially inwardly of the cavity, any radial growth of each one of the centering body portions being less than concurrent radial growth of remaining portions of the body during rotation of the shaft such that each one of the centering surface sections remain in contact with the shaft outer surface when remaining sections of the body inner circumferential surface are spaced radially outwardly from the shaft outer surface, each one of the centering surface sections being located so as to center the annular body about the shaft axis.

2. The assembly as recited in claim 1 wherein each centering body portion has a radial thickness defined between a radially innermost surface section of each cavity and the adjacent centering surface section, the radial thickness having a value between about fifty thousandths of an inch (0.050") and about three hundred thousandths of an inch (0.300").

3. The assembly as recited in claim 1 wherein each one of the centering surface sections remain in contact with the shaft outer surface when the shaft rotates at rotational speeds greater than ten thousand rotations per minute (10,000 rpm).

4. The assembly as recited in claim 1 wherein the annular body has a radially-outwardly extending shoulder adjacent to the first axial end such that the mass of the annular body at the first axial end is substantially greater than the mass of the annular body at the second axial end.

5. The assembly as recited in claim 4 wherein the shoulder has an axial length and each one of the cavities has an axial length of at least one quarter of the axial length of the shoulder.

6. The assembly as recited in claim 1 wherein each one of the cavities has an axial length of at least two hundred fifty thousandths of an inch (0.250").

7. The assembly as recited in claim 1 wherein each one of the cavities is formed as an arcuate slotted opening.

8. The assembly as recited in claim 1 wherein the annular body has six of the at least three cavities.

9. The assembly as recited in claim 1 wherein the annular body includes at least one of a seal runner surface, a mounting surface for a seal runner, an axial-extending annular mounting groove for an axial face seal, and a plurality of radially-outwardly extending ridges for a labyrinth seal.

10. The assembly as recited in claim 1 wherein the outer circumferential surface of the annular body includes at least first and second outer surface sections each having an outside diameter, the outside diameter of the first surface section having a value greater than a value of the outside diameter of the second surface section.

11. A seal assembly comprising:
a shaft rotatable about a central axis and having an outer circumferential surface; and
a seal component including an annular body having a centerline, first and second axial ends spaced apart along the centerline, an inner circumferential surface, an opposing outer circumferential surface, the inner circumferential surface defining a central bore receiving the shaft and being sized such that the entire body inner surface is frictionally engaged with the shaft outer surface to couple the component with the shaft, and at least three cavities extending axially from the first axial end and spaced circumferentially about the centerline, each cavity being located adjacent to the bore so as to define a separate centering body portion between a radially innermost surface section of the cavity and an axially-extending centering surface section of the body inner circumferential surface located radially inwardly of the cavity, any radial growth of each one of the centering body portions being less than concurrent radial growth of remaining portions of the body during rotation of the shaft such that each one of the centering surface sections remain in contact with the shaft outer surface when remaining sections of the body inner circumferential surface are spaced radially outwardly from the shaft outer surface, each one of the centering surface sections being located so as to center the annular body about the shaft axis;
wherein the annular body further includes at least one of a seal runner surface, a mounting surface for a seal runner, an axial-extending annular mounting groove for an axial face seal, and a plurality of radially-outwardly extending ridges for a labyrinth seal.

12. The seal assembly as recited in claim 11 further comprising at least one of:
an outer case assembly disposed about the seal component;
a generally tubular seal runner disposed about the outer circumferential surface of the annular body of the seal component and a circumferential seal member disposed about the seal runner;
a generally tubular face seal retainer disposed about the outer circumferential surface of the seal components and at least one axial face seal member coupled with the seal retainer or with an outer case assembly disposed about the seal component; and
an axial face seal member disposed within an annular groove formed in the annular body of the seal component.

* * * * *